United States Patent Office 3,411,071
Patented Nov. 12, 1968

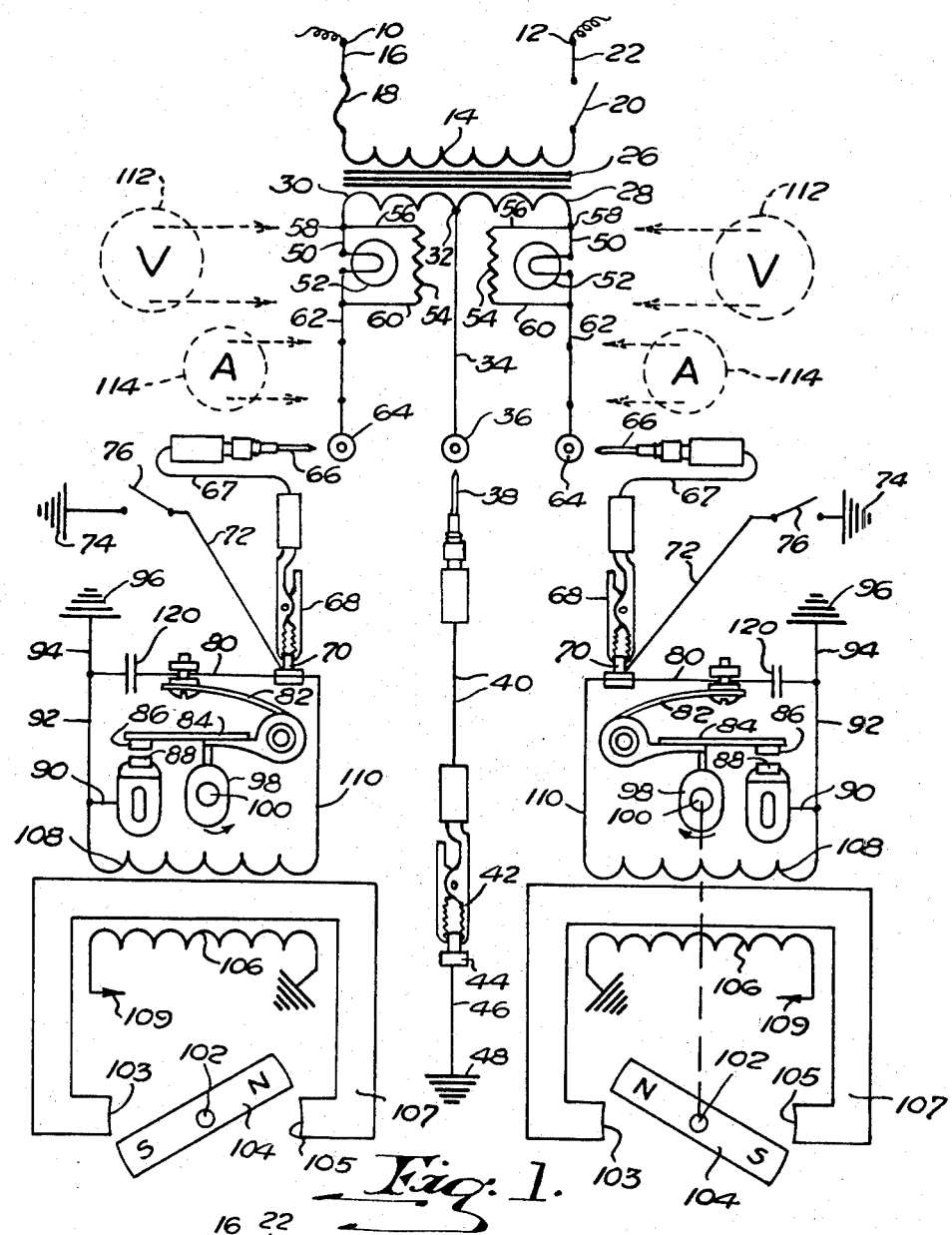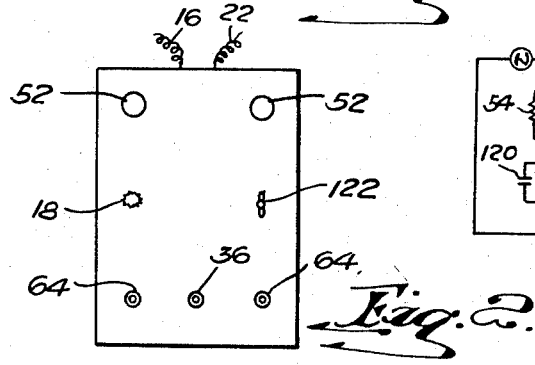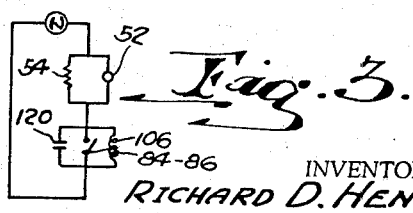

3,411,071
APPARATUS FOR TESTING IGNITION TIMING SYSTEMS
Richard D. Henry, R.F.D. 1, Clinton, Pa. 15026
Filed May 17, 1965, Ser. No. 456,056
2 Claims. (Cl. 324—15)

ABSTRACT OF THE DISCLOSURE

This invention pertains to a testing apparatus for ignition timing systems in which a signal lamp and resistor in parallel, are connected to the ignition system so that as the propeller is manually turned to bring a marking thereon into matched relation with a second marking, indicating fire position of the aircraft engine, the lamp signal will indicate as such, because as the marks are brought together, points move to an open position and current flow is directed through a primary coil of the magneto when counter EMF will produce such a current drop that the indicator will signal.

---

This invention relates to an apparatus and process for testing ignition timing systems, and more particularly timing systems which are designed for use in aircraft, dual magneto, battery systems or the like either synchronized or non-synchronized. The testing system is not necessarily restricted to particular locations or applications of the ignition system. The apparatus and process will be described in conjunction with the testing of timing ignition systems in aircraft engines having a dual magneto or battery which may be either synchronized or non-synchronized in operation. In the timing art, it has been common to use a stroboscopic light for timing the aircraft ignition system, but this has not proved satisfactory because it requires that the engine be operating and the propeller be turning, and there are dangers inherent in testing a timing system with an operative engine and rotating propeller. Accordingly, the art has long required, and it has long been in need of a satisfactory timing device which is usable for statically testing the aircraft engine timing system and determining whether its operation is in proper timed relation.

It is, therefore, one of the principal objects of the present invention to provide a testing apparatus and process which will accurately test the timing system within an aircraft engine or the like and will do so by static testing means; that is, one which will test the engine while the engine is nonoperative.

It is a further object of the present invention to provide a static testing device which utilizes as the signal generating means, a light, a sound emitter or the like which will generate a signal at the number one fire position of the aircraft engine so that the engine can accurately and precisely be timed in conjunction with a calibration mark which is originally set at the time of manufacture of the engine.

A still further object of the present invention is to provide an economical, readily usable apparatus which can be connected into the ignition system of an aircraft engine and can be easily operated to produce a signal which will accurately and precisely define the firing position of the engine and without disassembling or disconnecting the magneto primary from the points. In this way, timing testing for the engine can take place accurately, and with minimal disruption of the engine; hence, the testing can occur conveniently and accurately.

It is a still further object of the present invention to provide a test apparatus for ignition timing systems having a light which is normally illuminated and which will suddenly and completely extinguish at the occurrence of point-breaking, precisely locating the occurrence of such point-breaking for adjusting engine operation.

It is a yet further object of the present invention to combine in a single testing apparatus and process, means for detecting the occurrence of point-breaking within an ignition timing system having dual battery or magneto systems whereby such occurrence of point-break within each of the systems can be readily detected, separately tested for ignition timing, and compared with each other.

It is one of the important objects of the present invention to provide an indicator having a resistance element which multiplies the sensitivity of the indicator by means of the shunt connected resistance element. By decreasing the ohmic resistance, I have made it possible to increase the effect of the inductive resistance by a substantially greater amount thus making the circuit as a whole more sensitive to a change in ohmic resistance, which occurs when the set of contacts connected in shunt with the inductance is suddenly cut out at the number one fire position for the engine undergoing test.

FIGURE 1 is a circuit diagram showing the ignition timing system apparatus, there being two distinct aircraft magneto or battery systems, which are separately undergoing test;

FIGURE 2 is a front elevation view of the test apparatus which incorporates the circuit illustrated in FIGURE 1, and having an instrument panel including lights, jack, fuse, and switch; and, FIGURE 3 is a wiring diagram indicating schematically the elements on the circuit of FIGURE 1.

Referring now to the drawings, the timing system includes provision for a suitable voltage source which may be (by way of example) a 117 volt 60-cycle AC current applied to junctions 10 and 12 to energize a primary coil 14 through conductor 16, fuse 18, primary coil 14, switch 20, and conductor 22. The coil 14 is wound around a core 26 and energizes secondary coil windings 28 and 30, which is center-tapped by a contact 32 having a conductor 34 with pin jack 36 connectable with lead pin 38 which is connected through conductor 40 and clip 42 to a connector 44 having a conductor 46 to ground 48. The secondary coils 28 and 30 are separately energized and each is associated with a different circuit, both being of the same construction and features and only one of which will be described.

The energization of the two sections of secondary coils is to separately test distinct ignition systems which are provided with separate magnetos and points and the purpose of which is not only to establish the timing for the separate systems but also to determine whether the two systems are functioning synchronously and if not synchronously, by what phase of separation.

Referring to the system at the right-hand side of FIGURE 1, the voltage which is induced in the secondary coils 28 produces a voltage which is transmitted through conductor 50 to a bulb 52 (FIGURE 2), there being a shunt resistance 54 to protect the light bulb 52, the shunt resistance including conductor 56 connected at 58 to conductor 50 and through conductor 60 to conductor 62. The conductor 62 is connected with both the light 52 and resistor 54 and leads to a pin jack 64.

A lead pin 66 is inserted into the pin jack 64 (FIGURE 2) to provide a circuit through conductor 67 and alligator clip 68 to lead connector 70. During the testing operation, the conductor 72 from lead connector 70 is disconnected from ground 74 by opening the switch 76 so that the engine is operative and must be rendered inoperative by disconnecting the spark plug leads. The aircraft engine will not accidentally fire during testing.

The lead connector 70 is secured through conductor 80 to a switch arm 82 having a resilient second arm 84 which yieldably biases the points 86, 88, to a normally closed position, wherein current can flow from conductor 80, arm 82, arm 84, through closed switches 86, 88, to conductor 90, 92, 94, to ground 96. The arm 84 is raised to break the switches 86, 88, by being lifted through a cam 98 mounted on rotatable cam shaft 100, which rotates with shaft 102 carrying north-south pole magnet 104. The north-south pole rotates between the ends 103, 105 of magnetic coil core 107 having secondary coils 106 connected with high tension lead 109 and primary coil 108 is connected with conductors 110 and 92. At the firing point, there is induced a high voltage in windings 106 and when contacts 86, 88, break, there is produced a surge of current which is passed through coil 106 and produces firing of the engine through 109 unless switch 76 is closed.

In setting of timing, it is desirable to know the precise point at which the points 86, 88 separate to determine whether or not the firing occurs at the calibration marking on the hub of the propeller. In this way, the timing of the aircraft engine is properly adjusted.

By providing two indicator lights 52, each of which is separately but simultaneously tested during engine operation, it is possible to establish whether the two separate sets of magneto points 86, 88, are simultaneously separated so that the two magneto systems are firing synchronously.

Referring to FIGURE 3, voltage readings were taken across the primary coil 108 and it was found that with the points 86, 88, of the switch 84 open, the inductive reactance produced a much greater current drop when the resistance 54 was connected in shunt with the indicator, than when the resistance was not in the circuit.

Still referring to FIGURE 3, the circuit as a whole, represented by the formula $E=IZ$ is such that adding the resistance 54 as an ohmic resistance R, increases the inductive reactance effect of primary winding 108, when the switch 86, 88, is opened. Consequently, the indicator light 52 is more sensitive to opening of the switch 86–88 because the current flow I in the circuit is dropped almost to zero, owing to the increase of impedance when the switch is opened as compared to the impedance when the switch is closed.

*Operation*

In operation, the testing apparatus is inserted into the ignition system of the aircraft without disconnecting the primary of the magneto. For this reason, it is essential to disconnect the spark plug leads in order that the engine will not accidentally start during turning of the propeller. The aircraft engine, when it is originally manufactured, is calibrated so that a locating mark is formed on the rotatable hub of the propeller which matches with a similar mark on an adjacent relatively stationary part, and it is provided that these marks will match at the number one fire position for the ignition system. This is the calibration or reference point for timing the ignition system. When the testing apparatus is connected to the aircraft engine, the indicator mechanism should operate when these two described marks are aligned.

When the apparatus is ready for testing, the lead pins, 66, 38 are inserted into the pin jacks 64, 36, respectively, and a voltage source is applied to the junctions 10 and 12. The input voltage can vary, but typically, it is comprised on a 117 volt 60-cycle AC current. The system is protected by a fuse 18, and at the start of operation, the switch 20 is closed and the core 26 is energized by the windings 14 which form primary winding inducing a current flow through the secondary windings 28 and 30 which are tapped by a contact 32 connecting with conductor 34 which in turn connects with a pin jack 36. A lead pin 38 is inserted in the jack 36 making a circuit through conductor 40, alligator clip 42, connector 44, and conductor 46 to ground 48. The current which is induced to flow in the secondary coils 28 and 30 produces illumination of bulbs 52 in the right and left-hand sides of the device which is vertically symmetrical having identical right and left-hand sides, so that only one side will be described in detail, it being understood that the operation for one side of the apparatus applies equally to the other side. The purpose in having two separate but identically constructed circuits is that there are two magneto systems provided and it is necessary not only to test both, but to determine whether both are operating synchronously and if not synchronously, by what phase the two are separated. If the two systems are operated simultaneously, then the illuminating means 52 in the two respective sides will be illuminated simultaneously and extinguished simultaneously. It can be precisely established whether or not the illuminating means for the respective sides of the apparatus are simultaneously and identically affected.

All that is required to test the system is to open the switch 76, insert lead pin 66 into pin jack 64 and attach alligator clip 68 to lead connector 70. The system is timed by mechanically turning the propeller until the calibration mark on the rotatable hub of the propeller matches another mark on a stationary part adjacent the propeller hub (not shown) and noting whether the light 52 is extinguished when the calibration marks are matched. At the time of manufacture, the two marks are calibrated to match at the number one fire position. Except when the two marks match, the switches 86, 88, are closed; that is, the points 86, 88, are normally closed so that a circuit is provided in secondary coil 28, conductor 50, illuminating means 52, conductor 62, pin jack 64, lead pin 66, conductor 67, alligator clip 68, connector 70, conductor 80, arm 82, arm 84, closed switches 86, 88, conductor 90, conductor 92, conductor 94 and ground 96; but when the calibration marks are matched, the turning of the propeller should rotate the shaft 102 which supports the magnet 104 and acting through the rotatable cam 98 on shaft 100 to a position biassing the arm 84 upwardly and breaking the aforementioned circuit through closed switch points 86, 88, causing current to flow, between secondary coil 28 and connector 70 as before described, and then through conductor 110, winding 108, conductor 92, conductor 94, and ground 96. The resistance of the circuit with winding 108 is substantially greater than resistance of the circuit with the switches 86, 88 closed, shunting out the resistance 108. The substantial increase of resistance sharply reduces the current flow to the extent of extinguishing light 52; that is, at the calibration marking, the switch points 86, 88, should be immediately opened and light 52 extinguished. In this way, it can be determined whether the original calibration for the ignition system is still operative. Moreover, the timing is statically established; i.e., the apparatus works by manually turning the propeller and there is no need for dynamic calibration; i.e., calibration while the engine is running, calibration which requires a stroboscopic light.

It is not necessary to utilize a light 52 for the signalling means, it is also possible to use an audible signal which is actuated under high current flow but which becomes substantially inaudible during low current flow and is inoperative when points 86, 88 are opened and resistance 108 is in series. There may also be used an oscilloscope which will detect the change in current which occurs at the opening of switch points 86, 88 because of the increase in resistance owing to winding 108.

Further testing of the currents of the point opening can be had visually by use of voltmeter 112 and ammeter 114 or a combination of both.

An important feature of the present invention is the use of resistance element 54 which is in shunt with indicator 52. The function of the resistance element 54 is to modify the ohmic resistance of the combination indicator means 52 and resistance 54 in a manner causing it to increase the current flow in the total system including the primary coil winding 108 of the magneto. It has been found that the inductive resistance from the winding 108 is substantially greater than the ohmic resistance of the winding so that decreasing the ohmic resistance in the test apparatus will increase the effect of the inductive resistance, whereby the total resistance of the system becomes more affected by opening of the contact points 86, 88. This has been substantiated by voltmeter readings taken across primary coil winding 108, and within the instrument proper.

If it were not for shunt resistance 54, the ohmic resistance of the testing apparatus would be of greater effect and there would be less current flow through the primary coil 108 and the effect of the inductive resistance would be less great so that the total resistance of the system is less; and, hence, less current drop when the points 86, 88, are opened. Consequently, the indicator 52, in the case of a bulb, would be merely dimmed instead of extinguished when the points open. It is, therefore, an important feature of the present invention that by merely adding an inexpensive resistance 54 to the instrument, testing the timing, it is possible to amplify the effect of opening the switches. Those skilled in the art faced with similar problems in the past, have turned to expensive and complicated amplifying devices which added to the cost and complexity of the testing device. In contrast with these prior art teachings, I merely add a resistance element which is readily available and which is inexpensive; and, nevertheless, serves the required function.

It is only necessary that the resistance element 54 have sufficient resistance so that it will not "pull down" the voltage imposed across 10–12, i.e., should the bulb 52 burn out, and have a high resistance, then shunt resistance 54 should not be so slight as to allow free or unimpeded flow of current through a conductor 62, pin jack 64, connector pin 66, conductor 67, alligator clip 68, connector 70, conductor 80, arm 82, arm 84, closed contacts 86, 88, conductor 90, conductor 92, conductor 94, to ground 96.

The system is restored to operation by simply removing the alligator clips 68. The test system has in no way disrupted the ignition system, either the magneto coils or any other portion of the magneto system.

In operation of the magneto system, the rotating shaft 102 causes the magnet 104 to rotate past the ends 103, 105, of the core 107 causing a periodic surge of voltage from winding 106 to high tension lead 109. The purpose of the capacitor 120 in conductor 80 is so that when the rotating magnet in shaft 102 causes the cam 98 to raise the arm 84 and break the contact points 86, 88, the effect of the capacitor 120 will be to spike the surge of voltage in coil 106 to fire at the number one position. The timing is essentially a matter of causing the points 86, 88, to open at the precise angular position of the magnet 104 and shaft 102. The proper location of firing is determined by matching the complementary reference marks on the rotatable propeller and adjoining nonrotatable structure, these points being established at the time of manufacture.

The testing apparatus is turned off and on by a manual switch 122 after the system is connected as shown in FIGURE 1, and both magneto systems are separately and independently tested for timing and the timing operations are determined relatively to each other by noting whether the lights 52 are simultaneously illuminated and extinguished. In contrast with previous timing systems, the indicator lights 52 or other indicator means such as audible signals, oscilloscope means or the like are not merely changed slightly but instead the transition is sharply noted because of the sudden transition from full current flow to no current flow at the precise point of opening of the contact points 86, 88.

The capacitive reactance of the system (FIGURE 3) is negligible and can be disregarded either when the switch is opened or closed. It has been found that the capacitor's effect on impedance is not significant. If, however, ohmic resistance 54 were not included then the impedance of the circuit (FIGURE 3) is not as greatly affected by opening and closing of the switch 86–88; and, consequently, the circuit is less affected by opening and closing of the switch, and the indicator means, in the form of a bulb or the like, merely dims or changes in brilliance instead of winking out entirely.

Although the present invention has been described in connection with certain selected example embodiments thereof, it will be understood that these are illustrative of the invention and are by no means restrictive thereof. It is reasonably to be expected that those skilled in this art can make numerous revisions and adaptations of the invention to suit individual design requirements, and it is intended that such revisions and adaptations which incorporate the disclosed principles will be included within the scope of the following claims as equivalents of the invention.

What is claimed is:

1. Apparatus for testing magneto ignition systems comprising a transformer having primary and secondary windings, a mechanically operated normally closed switch and a magneto coil which form a part of said ignition system and wherein said switch is connected in parallel with the primary of said magneto coil and is adapted to open only during ignition operation, means forming a mechanical interconnection between said magneto and said switch whereby said switch is mechanically operated to effect opening thereof at a firing position of said magneto, indicator means, conductor means serially connecting said indicator means, said transformer secondary winding and said switch in a closed circuit loop whereby said indicator means is responsive to the operating conditions of said magneto ignition system, resistance means connected in parallel with said indicator means which in cooperation with the inductive reactance of said magneto provides a current amplification effect to produce a substantial decrease of current flow when said switch is mechanically opened by said magneto at its fire position whereby the indicator means is abruptly operated, and means providing an alternating current source connected to the primary of said transformer whereby as said magneto is manually operated said indicator means will signal whether the magneto fires at the calibrated position of said magneto ignition system.

2. The apparatus in accordance with claim 1 including means for concurrently testing a second magneto which is operable synchronously with said first magneto to determine whether said magnetoes are simultaneously actuated.

References Cited

UNITED STATES PATENTS

| | | | |
|---|---|---|---|
| 1,453,635 | 5/1923 | Morris | 324—16 |
| 2,184,304 | 12/1939 | Johnson | 324—16 |
| 2,383,557 | 8/1945 | McClellan | 324—16 |
| 2,774,033 | 12/1956 | Penn | 324—16 |
| 2,938,161 | 5/1960 | Schater | 324—15 |

RUDOLPH ROLINEC, *Primary Examiner.*

M. J. LYNCH, *Assistant Examiner.*